March 15, 1932.   E. L. BALLEW   1,850,048
RACING APPARATUS
Filed June 25, 1927   7 Sheets-Sheet 1

Elmer L. Ballew
INVENTOR
BY Victor J. Evans
ATTORNEY

March 15, 1932. E. L. BALLEW 1,850,048
RACING APPARATUS
Filed June 25, 1927 7 Sheets-Sheet 2

Elmer L. Ballew
INVENTOR
BY Victor J. Evans
ATTORNEY

March 15, 1932.   E. L. BALLEW   1,850,048
RACING APPARATUS
Filed June 25, 1927   7 Sheets-Sheet 3

Elmer L. Ballew INVENTOR
BY Victor J. Evans ATTORNEY

Patented Mar. 15, 1932

1,850,048

UNITED STATES PATENT OFFICE

ELMER L. BALLEW, OF CHICAGO, ILLINOIS

RACING APPARATUS

Application filed June 25, 1927. Serial No. 201,432.

This invention relates to certain novel improvements in racing apparatus and is particularly adapted to improvements in such apparatus wherein a lure is directed around a race course which serves to induce animals to pursue it. Such apparatus is particularly used to induce dogs to pursue an inanimate rabbit. My invention is particularly but not necessarily directed to such usage.

Chief among the objects of my invention is to provide a device for propelling the lure around the track.

Another object, ancillary to the foregoing is to construct a device in such a manner as to afford expeditious transportation thereof. This is salient among the objects of my invention for the devices of the prior art have been constructed in the form of a so-called permanent installation.

Another object of the invention is to provide a device for propelling the lure in animal racing wherein the lure may be made to disappear at desired times.

A further object of the invention consists in arranging the lure in a manner such that it may be directed over hurdles or other obstacles in race courses so as to induce the animals to leap over such obstacles.

A further object of the invention consists in arranging the lure in such a manner that the speed thereof may be expeditiously controlled.

A still further object consists in arranging the lure propelling mechanism in such a way that it may be mounted in either the infield or the outfield of the race course.

And a still further object of the invention consists in providing a mechanical arrangement for the lure propelling device which will be simple in construction and operation and economical to manufacture.

Other objects will appear hereinafter.

The invention consists in the novel combination and arrangement of parts to be hereinafter described and claimed.

The invention will be best understood by reference to the accompanying drawings, showing the preferred form of construction and in which.

Figure 1:
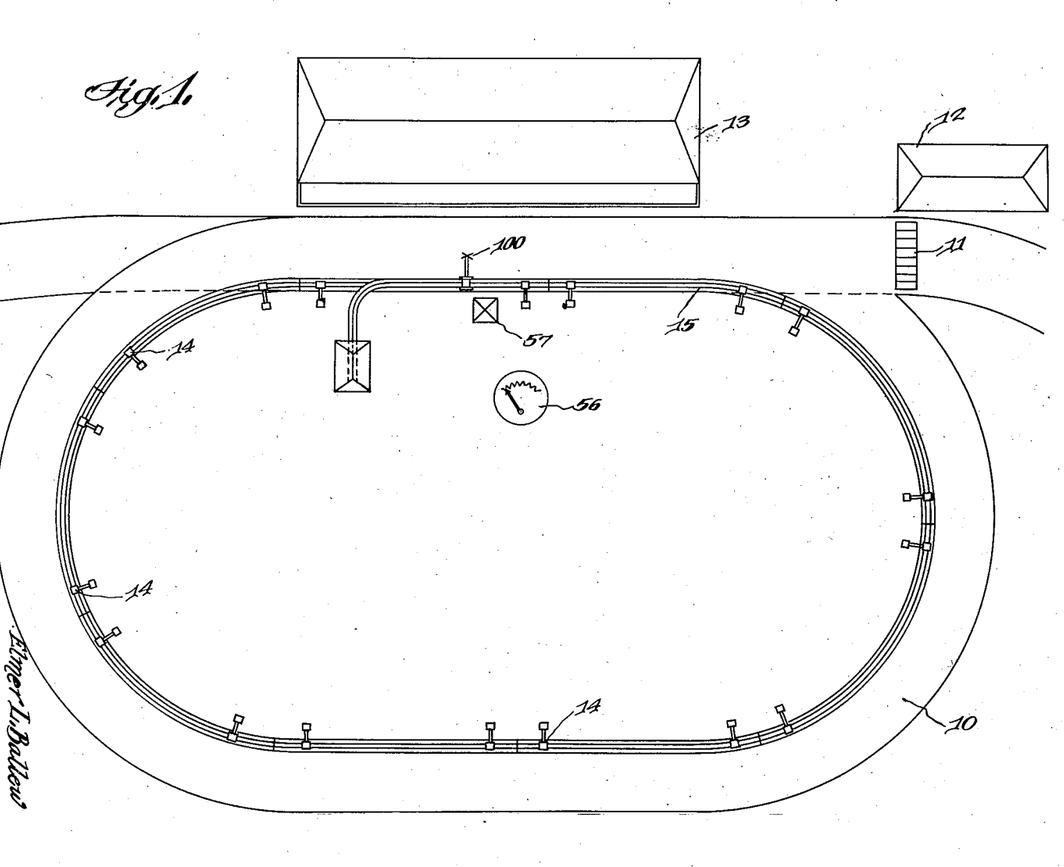
Fig. 1 is a plan view of a race course such as that on which my invention is used.

In the racing of dogs about a course such that indicated in Fig. 1 by 10, a lure is propelled around this course in order to induce the dogs to pursue it. The dogs which are to participate in the race are housed in compartments generally indicated by 11 which are closed on the front side thereof by a gate known as the starting gate which may be quickly withdrawn in order to permit the escape of the dogs. The lure is placed a short distance in front of the starting compartments 11 and as the lure is started on its travel about the course, the starting gate is withdrawn and the dogs leap out and attempt to catch the rabbit or other lure. The lure is then propelled about the course at a speed sufficient to keep it in advance of the dogs and when the course has been covered the lure is caused to disappear and thus the dogs cease running and they are captured and returned to their kennels which are generally indicated by 12 in the drawings. The race is carried on on a course and arranged at an advantageous place on this course is a grandstand suitable for spectators which is generally indicated by 13 in the drawings. The means for causing the lure to travel around the course will now be described in detail.

As can be seen by referring to Fig. 1, the course 10 is substantially oval shaped and while this construction is preferable, it is not necessary for the course may be made in any desired shape. As will be apparent in the following description, the track 15 which is adapted to support and direct the lure propelling mechanism may be located either in the infield or the outfield of the course. In the present instance, I have shown the track 15 as being located in the infield and it is adapted to consist of a plurality of suitably formed sections. By referring to either Figs. 9 or 18, it may be seen that the track is supported by suitable brackets such as 14. These brackets are adapted to be supported either by stakes driven into the ground at proper points or by other analogous suitably located supporting members.

Figures 2, 19:
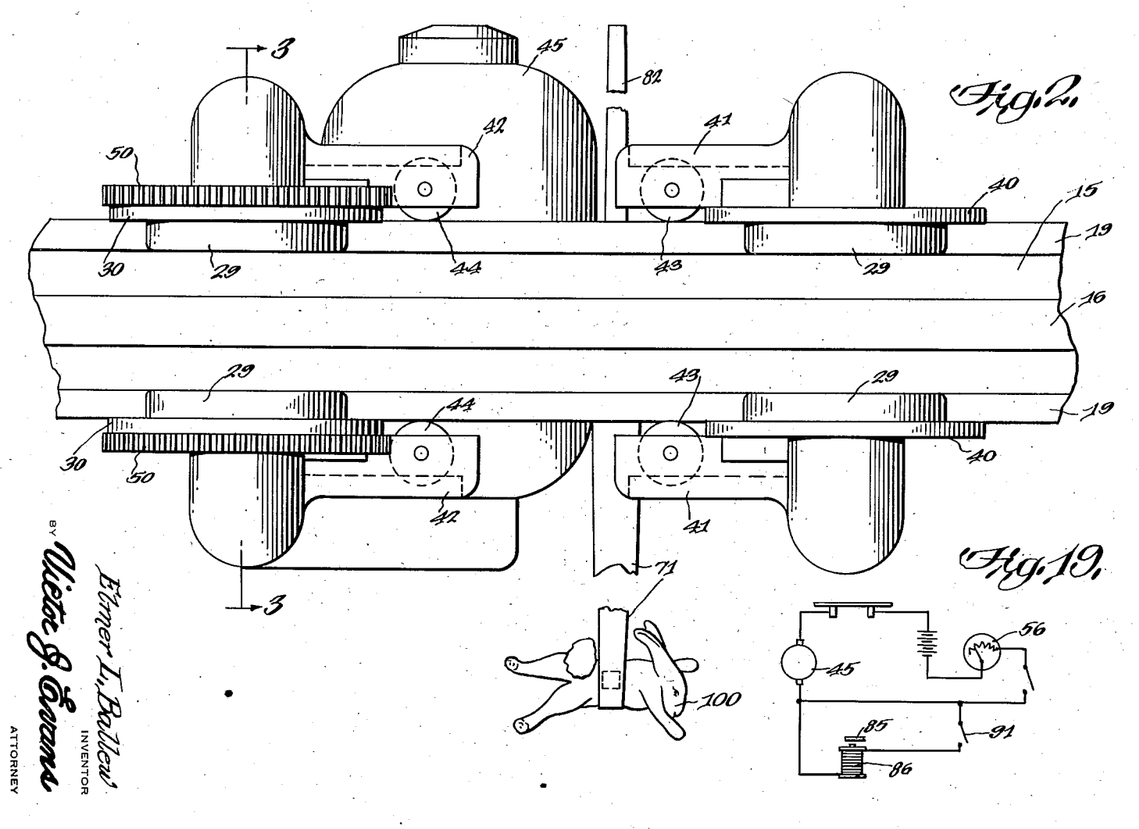
Fig. 2 is a plan view of the lure propelling device.
Fig. 19 is a diagrammatic view of the electric circuit employed in the device.
Figures 3, 18:
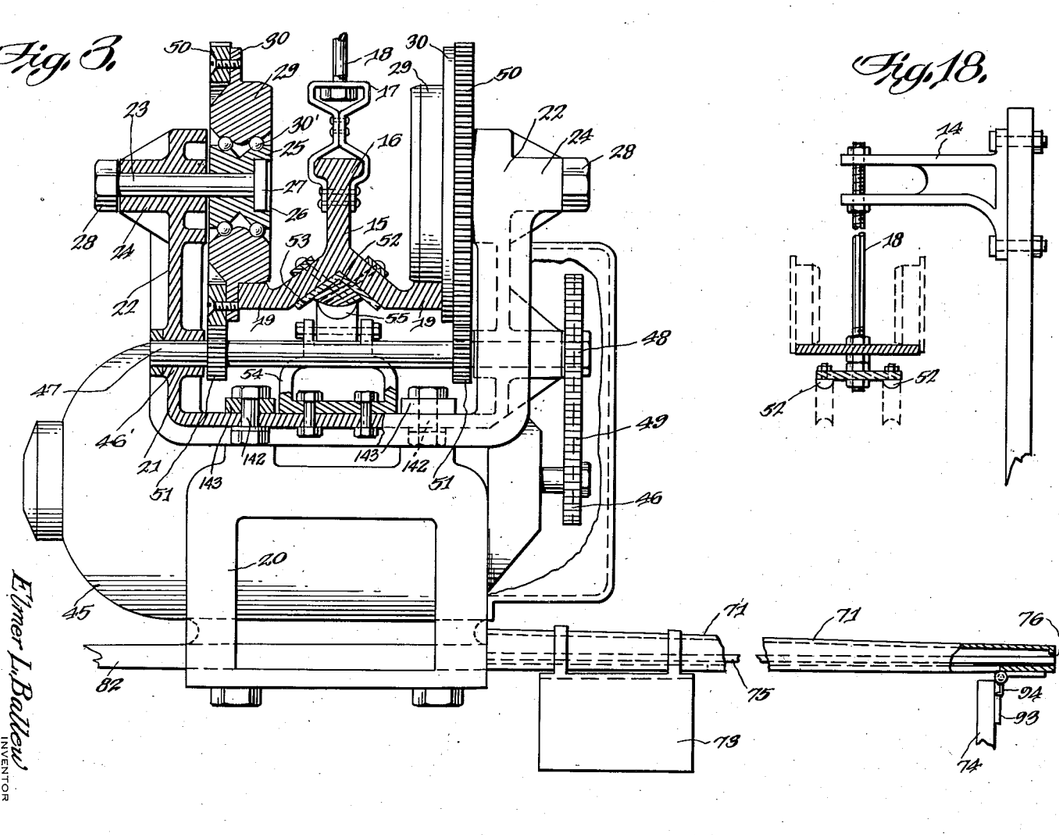
Fig. 3 is a sectional view taken substantially in plane of the line 3—3 on Fig. 2.
Fig. 18 is a detail view of a modified form of track supporting bracket which also shows another modification of the track structure.
Figure 4:
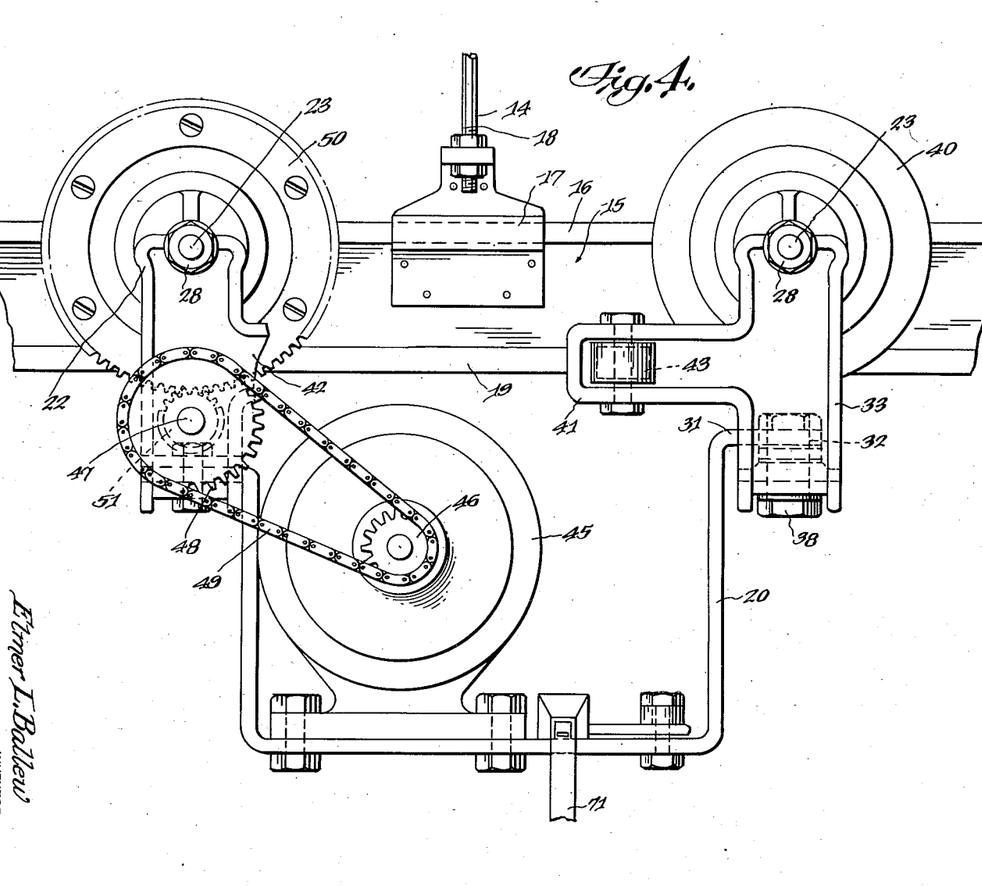
Fig. 4 is a side elevational view of the device illustrated in Fig. 2.

Referring particularly to Figs. 2, 3 and 4, it may be seen that the track 15 embodies an upwardly protruding portion 16 and a suitable clamp arrangement 17 is secured thereto which is adapted to be supported by the brackets 14 in any suitable manner such as by the rods 18. Referring particularly to Fig. 3, it may be seen that the track 15 in this instance is formed so as to be substantially Y-shaped and that portions of the branches of the Y are adapted to be horizontally disposed. These portions are generally indicated in the drawings by 19 and are adapted to serve as supporting tracks for the lure propelling device.

The lure supporting device embodies a frame 20 and suitably secured to this frame on the upper side and at one end thereof is a substantially U-shaped bracket 21. The U-shaped bracket 21 is arranged so that the parallel portions thereof are vertically disposed, these portions being indicated by 22 in the drawings. In the upper part of the portions 22 shafts such as 23 are journaled in bearings 24 provided in the portions 22. Disposed so as to be in abutment with the inner sides of the portions 22 are hubs 25 which are mounted on the shafts 23 and which in this instance embody recesses 26 into which a flange 27 that is unitary with the shaft 23 is adapted to be fitted. The opposite end of the shafts 23, which is disposed extraneously of the portions 22, is screw threaded and nuts 28 are adapted to engage these screw threads and this construction serves to securely lock the hubs 25 in position. Disposed around the hubs 25 are wheels 29 that are adapted to ride on the portions 19 of the track 15. The wheels 29 are preferably spaced away from the hubs 25 in order that anti-friction bearings 30' may be mounted therebetween. In the present instance, I have shown balls as being used in the anti-friction bearings but it is to be understood that any other suitable anti-friction bearing might be used. The wheels 29 embody flanges 30 which serve to prevent endwise displacement of the wheels from the track. The foregoing construction serves to support one end of the frame 20 of the lure propelling device.

Figures 6, 7, 8, 9, 10, 21:
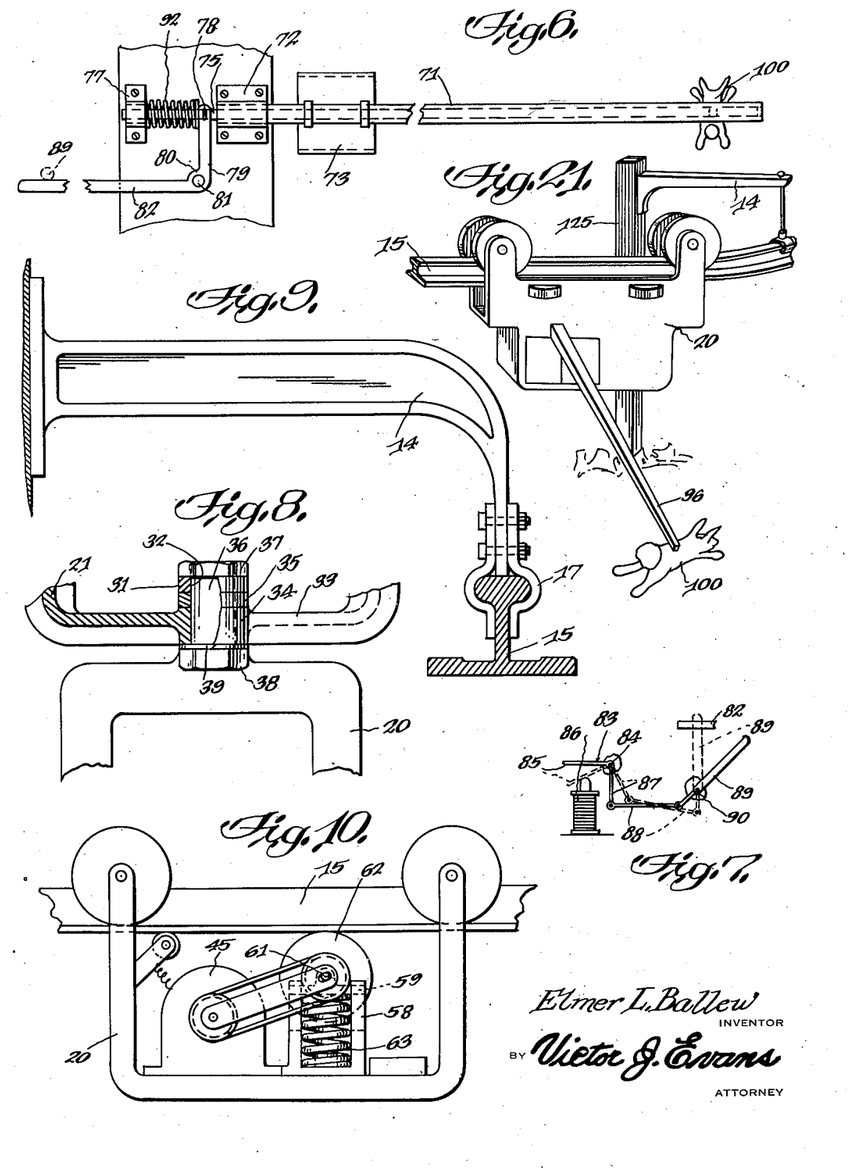
Fig. 6 is a plan detail view of the lure supporting mechanism.
Fig. 7 is a diagrammatic view of a mechanism adapted to operate on the lure supporting mechanism.
Fig. 8 is a detail view of a portion of the lure propelling mechanism.
Fig. 9 is a detail view of a track supporting bracket.
Fig. 10 is an elevational view of a modified form of drive mechanism employed in the device.
Fig. 21 is a view similar to Fig. 5 showing a modified form of construction.

In Fig. 8 an arrangement is shown for supporting the other end of the lure propelling device. In this instance the frame 20 embodies a horizontally disposed portion 31 (Fig. 4) which has an opening 32 therein. A bracket 33 embodying a bearing 34 is juxtapositioned to the portion 31 of the frame 20 and is spaced away from said frame by a collar 35. A stud 36 extends through the opening 32, collar 35 and the bearing 34 and embodies threaded end portions on which the nuts 37 and 38 are fitted so as to securely lock the stud 36 in position. A suitable lock washer 39 is disposed between the nut 38 and the bracket 33 for purposes well understood in the art. The bracket 33 is arranged so as to support the wheels 40 in a manner similar to that in which the wheels 29 are supported and the wheels 40 are arranged similarly to the wheels 29 and are also adapted to ride on the portions 19 of the track 15. It is apparent that the frame 20 can turn about the bracket 33 due to the just described stud construction shown in Fig. 8 and therefore the bracket 33 and wheels 40 may pivot about the stud 36 and the lure propelling device may be expeditiously directed around the turns or curves in track 15 which are necessary in order to follow the contour of the race course. The other end of the frame is, as shown in Fig. 3, rigidly connected to the bracket 21 by nut bearing bolts 142 which extend through bracket 21 and horizontal portions 143 of frame 20. This is necessary because the chain 49, which delivers power from the motor 45 carried by frame 20, revolves about the sprocket 48 which is carried by a shaft 47 that is journaled in the portions 22 of the bracket 21, and hence a pivotal connection between this end of the frame 20 and bracket 21 would interfere with the operation of the chain 49. Both the brackets 33 and 21 embody horizontally disposed end portions 41 and 42 in which the rollers 43 and 44 are mounted, these rollers being disposed on opposite sides of the track 15 and being adapted to engage the edge of the portions 19 in order to prevent endwise displacement of the device, this construction serving to relieve the strain on the flanges provided on the wheels 29 and 40.

In order to drive the lure propelling device about the track 15, the following mechanisms are provided. Supported by the frame 20 is a suitable motor 45 which in the present instance has a pinion 46 provided on one end of the shaft thereof. The bearings 46 are provided in the upwardly protruding portions 22 and a shaft 47 is rotatably journaled in these bearings. On the end of the shaft 47 in alignment with the sprocket 46, a sprocket 48 is mounted and a suitable chain belt 49 interconnects these two sprockets so as to transmit the movement of the motor 45 to the shaft 47. It is to be understood that a gear train might be substituted in place of the chain and sprocket construction, shown and described, or a belt and pulley construction might be substituted. By referring to Fig. 3, it may be seen that the wheels 29 have a portion thereof cut away in the region of the flange 30 and secured to the flange 30 in this cut away portion are ring-shaped spur gears 50. Keyed to the shaft 47 so as to mesh with the spur gears 50 are pinions 51. As the shaft 47 revolves, the movement thereof is transmitted through the pinions 51 to the gears 50 and thus to the wheels 29. The weight of the lure propelling device as described is great enough to provide sufficient friction between the wheels 29 and the portions 19 of the track 15 to cause the propulsion of the device about said track as the wheels 29 are caused to revolve.

It is apparent that the motor 45 is adapted to be electrically operated and in order to supply current thereto, one side of a suitable source of power is grounded on the track 15. One side of the windings of the motor 45 is connected to the frame 20 which will be in electrical engagement with the track 15. The other side of the source of power is connected to a trolley 52 that is carried by the track 15 and is insulated therefrom by suitable insulating strips 53. A bracket 54 is secured to the central portion of the bracket 21 and carries a contact 55 that is adapted to engage the trolley 52. The contact 55 is adapted to be insulated from the bracket 54 and a suitable connection is made between this contact 55 and the other side of the winding of the motor 45 and in this manner current is supplied to the motor 45.

In order to regulate the speed with which the lure propulsion device moves about the track 15, an arrangement is provided for regulating the flow of current to the motor 45. In the present instance a rheostat 56 is placed in the circuit to the motor 45, this rheostat being adapted to be located at a suitable point such as, for example, in the judge's stand 57. It is necessary that the rheostat 56 be located at some point affording a view of the course at all times in order that the operator of the lure may be enabled to keep the lure in advance of the dogs. If desired, one rheostat may be provided for propelling the lure as it travels about the track 15. However, if desired, separate rheostats may be provided for each section of the track 15. The specific form of speed controlling mechanism may be altered as the specific device used to accomplish this forms no part of my invention.

In Fig. 10 a modified form of the invention is illustrated. In this modification the lure propulsion device is adapted to be motor-driven as in the first case, but in place of the gear train a friction drive is substituted. A suitable bracket 58 is mounted in the frame 20 which supports a plate 59 on which bearings such as those shown are provided in which a shaft 61 is journaled. Mounted for rotation on the shaft 61 is a friction wheel 62 that is adapted to engage the underside of the track 15. A spring 63 is provided in the bracket 58 which acts on the plate 59 to force the roller 62 into frictional engagement with the track, the strength of this spring being great enough to insure sufficient friction between the roller and the track. In the present instance, the roller 62 is driven by a belt and pulley construction, but it is to be understood that any other analogous power transmitting mechanism might be substituted in place of this construction.

Figures 5, 11, 12, 13, 14, 15, 16, 17, 20:
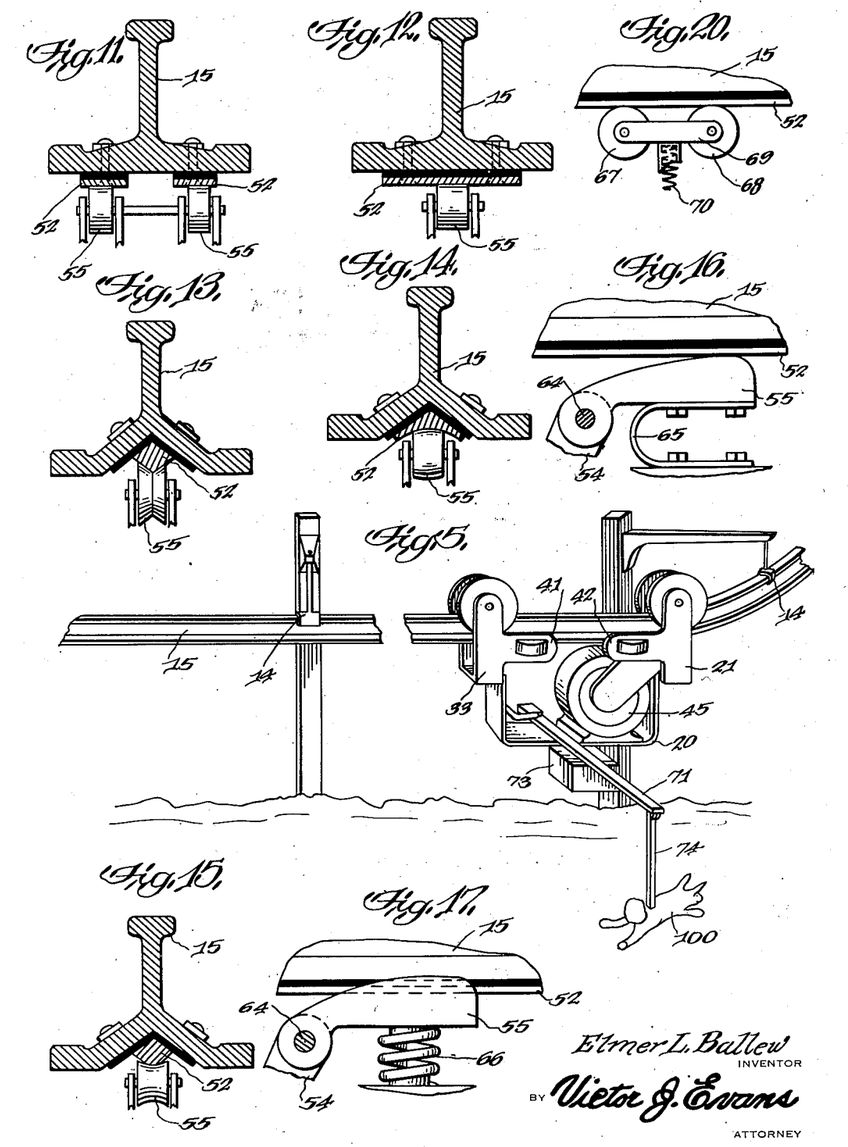
Fig. 5 is a perspective view of the apparatus in operative position.
Figs. 11 to 15 inclusive are detail views showing the various embodiments of the track construction and current conductors.
Figs. 16 and 17 are detail views of modified forms of trolley and contact constructions employed in the device.
Fig. 20 is a detail view of one form of trolley construction employed in the device.

In Figs. 11 to 15 inclusive, various forms for construction of the track 15 are shown. In Fig. 11, two contact strips are provided in order that it will not be necessary to ground one side of the source of power. Any of these constructions may be employed in my device and inasmuch as the drawings clearly illustrate the formation thereof, detailed discussion will not be given herein.

In Figs. 16, 17, and 20, various forms of the contacts 55 are illustrated. In Fig. 16 the contact 55 is pivotally connected to the bracket 54 as at 64 and a suitable leaf spring 65 is provided which is adapted to urge the contact 55 into engagement with the trolley 52. In Fig. 17 a coil spring 66 is substituted for the leaf spring 65. In Fig. 20 the contact is made so as to embody rollers 67 and 68 carried by suitable brackets 69. The rollers 67 and 68 are adapted to engage the trolley 52 and are forced into engagement therewith by a suitable spring 70. The particular mounting of these parts will be readily apparent to anyone skilled in the art.

In the present instance, the lure employed is an inanimate rabbit which is preferably formed of a stuffed rabbit skin and this lure is generally indicated in the drawings by 100. Secured to the frame 20 is an outwardly protruding tubular member 71 which is secured to the frame 20 by a suitable bracket 72 (Fig. 6). Suspended from the tubular member 71 is a lure receiving cage 73 which is best shown in Fig. 3. The preferable construction for this cage is a substantially U-shaped configuration arranged so that its open end is downwardly disposed. As is shown in Fig. 5, a downwardly protruding rod 74 is carried at the outer end of the tubular member 71 which is adapted to support the lure a short distance above the course in view of the dogs in order that they shall be induced to follow it. As is best shown in Fig. 3, a rod 75 protrudes through the tubular member 71, the outer end of which is normally retained in a recess 76 provided in the outer end of the tubular member 71. As is shown in Fig. 6, the rod 75 extends into the lure propulsion device and is slidably supported therein on the frame 20 by a bracket 77. Secured to the rod 75 by a pin and slot connection generally indicated at 78 is the arm 79 of the bell crank 80 that is pivotally mounted on the frame 20 as at 81. The arm 82 of the bell crank 80 extends beyond the frame 20. In Fig. 7 a device adapted to engage the arm 82 is diagrammatically illustrated, the full lines in this figure indicating the inoperative position thereof. A bell crank 83 is pivotally mounted as at 84 to a suitable support and has an arm 85 that is normally disposed in the flux of an electromagnet 86 so as to be attracted toward said magnet when it is energized. Pivotally connected to the arm 87 of the bell crank 83 is a link 88 and the opposite end of said link is pivotally connected to one end of a lever 89 which is pivotally mounted as at 90 to a suitable support. The device as illustrated in Fig. 7 is adapted to be located in juxtaposition to the track 15 and is so positioned that when the arm 89 is occupying the position indicated by the dotted lines in this position, it will be disposed so as to lie in the path of the arm 82 of the bell crank 80 as is thus shown in Fig. 6.

The magnet 86 is adapted to be energized by current supplied from a suitable source of power such as, for example, that which supplies current to the motor 45. When the magnet 86 is energized by the closing of the button 91 that is disposed in the circuit thereto, the arm 85 will be attracted. It is preferable though not necessary that the button 91 be located at a point near the rheostat 56 in order that the operator of the device may control both mechanisms. When the arm 85 is attracted toward the magnet 86, the arm 87 of the bell crank 83 will be caused to pivot about the pivot 84 and movement thereof will be transmitted through the link 88 to the lever 89 and this movement will cause the parts to assume the position indicated by the dotted lines in Fig. 7. As the lure propulsion device moves about the track 15 and approaches the point at which the device illustrated in Fig. 7 is located, if the magnet 86 is energized the arm 82 of the bell crank 80 will strike the lever 89. This will cause the arm 82 to pivot about the pivot point 81 and will thus cause the arm 79 to move the rod 75 toward the bracket 77 against the action of the spring 92 that normally urges the rod 75 in the opposite direction. Movement of the rod 75 in this direction will cause the end thereof to be retracted from the recess 76. The arm 74 is secured to the tubular member 71 by a suitable hinge structure such as 93 (Fig. 3). A spring 94 is provided in this hinge structure which tends to urge the arm 74 toward the lure propulsion device. This action is normally restrained by the engagement between the arm 74 and the rod 75 when said rod is retained in the recess 76. However, when the rod 75 is withdrawn from the recess 76 in the heretofore described manner, the rod will move toward the upper part of the tubular member 71 and this will permit the spring 94 to cause the arm 74 to pivot about the hinge structure 73 toward the lure propelling device. The lure receiving cage is disposed along the tubular member 71 at such a point that when the arm 74 pivots toward the tubular member 71, the lure will enter the cage 73 and be concealed from view.

If desired, a plurality of such devices such as diagrammatically illustrated in Fig. 7 may be located at various points around the course. However, the chief usage of this device will be just beyond the judge's stand 57. After the dogs have passed the judge's stand 57 the second time, the race will have been completed if the race is to consist of one heat and therefore it is advantageous to stop the dogs. It is understood that when the magnet 86 is not energized, the arm 89 will not lie in the path of the arm 82. However, when it becomes desirable to conceal the lure as has just been described, the magnet 86 will be energized and thus the lever 89 will lie in the path of the arm 82 and when the arm 82 strikes said lever the lure will be caused to disappear in the just described manner.

Figures 22, 23, 24, 25, 26, 27, 28:
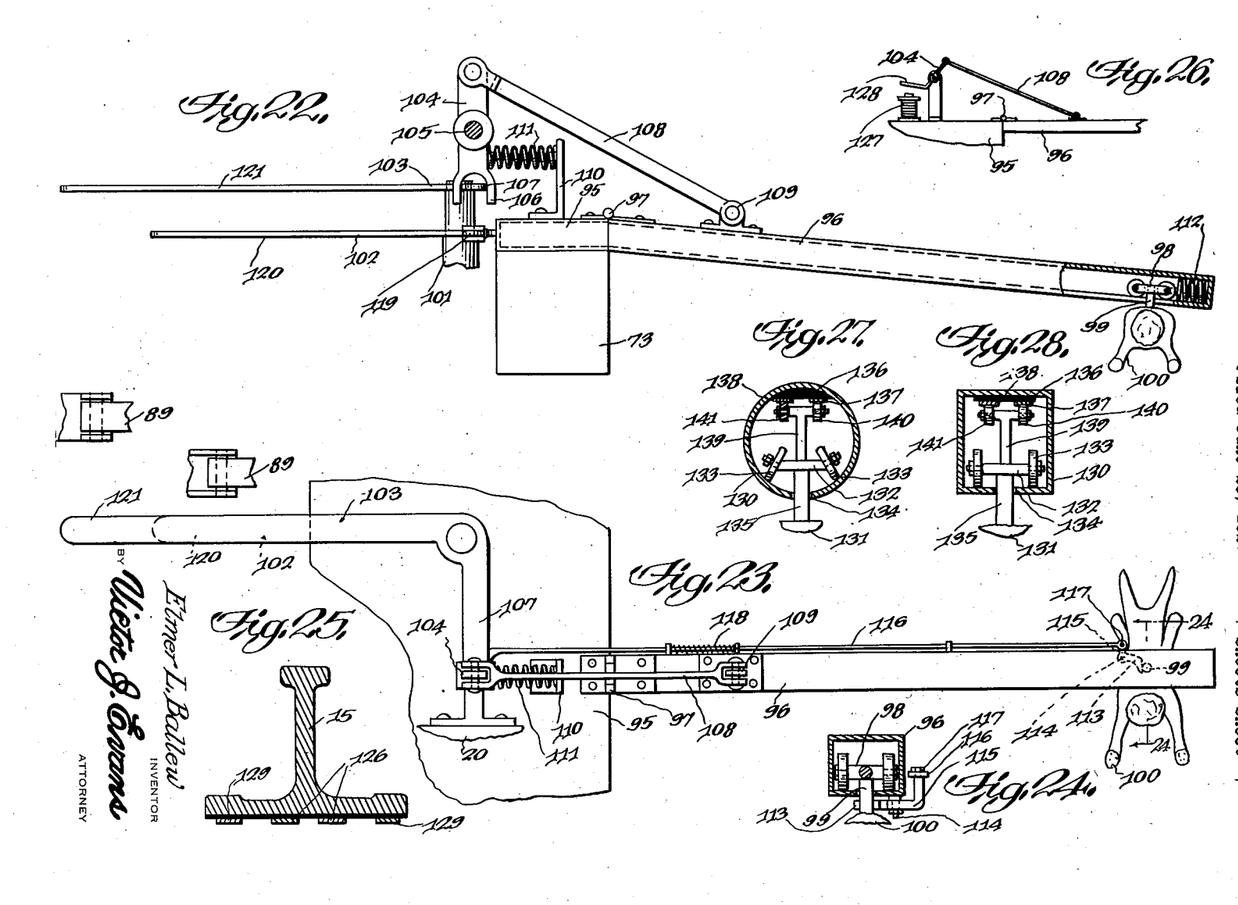
Fig. 22 is an end elevational view of the device illustrated in Fig. 21.
Fig. 23 is a plan view of the device illustrated in Fig. 22.
Fig. 24 is a sectional detail view taken substantially in the plane of the line 24—24 on Fig. 23.
Fig. 25 is a view of a modified form of track structure.
Fig. 26 is a detail view of a device used on the lure propelling mechanism.
Fig. 27 is a detail view of a modified form of track structure, wherein the lure propelling mechanism is supported by a carriage adapted to travel interiorly of the track member.
Fig. 28 is a detail view of another modification similar to Fig. 27.

In Figs. 21 to 24 inclusive, a modified form of construction for causing the lure to disappear is illustrated. In this instance, a supporting block 95 is secured to the frame 20 as is best shown in Fig. 22. An arm 96 is secured thereto by a hinge structure such as 97. The arm 96 is arranged so as to be hollow and embodies a slot 96a on the underside thereof. A carriage 98 is adapted to travel on the interior of the arm 96 and embodies a lug 99 that protrudes through the slot 96a to which the lure 100 is adapted to be secured. Normally the arm 96 is disposed so as to be inclined slightly below the horizontal as is best illustrated in Fig. 22. An upwardly protruding supporting bracket 101 is provided on the frame 20 and bell cranks 102 and 103 are pivotally mounted thereon in vertical alignment. A rocker member 104 is pivotally mounted on the frame 20 as at 105 and embodies at its lower end a fork construction 106 through which the arm 107 of the bell crank 103 protrudes. To the upper end of the rocker 104 a link 108 is secured and the opposite end of this link is pivotally attached to the arm 97 as at 109. A bracket 110 is mounted on the block 95 and a spring 111 extends between this bracket 110 and the lower portion of the rocker 104 so as to act on this rocker and through the link 108 so as to retain the arm 96 in the position illustrated in Fig. 22. At the outer end of the arm 96, a spring 112 is provided which is adapted to be under compression when the carriage 98 is in the position illustrated in Fig. 22, and is adapted to be held under compression by the said carriage which is retained by the latch 113 which is pivotally mounted at 114 and which embodies an arm 115. A rod 116 is carried by the arm 96 and extends therealong and is pivotally connected to the arm 115 of the latch 113 as at 117. A spring 118 is disposed around the rod 116 and urges this rod in a direction such that it serves to hold the latch 113 in a position so as to hold the carriage 98 in the just described location. The inner end of the rod 116 is pivotally connected to the arm 119 of the bell crank 102.

In employing the device just described, two such mechanisms as illustrated in Fig. 7 are located at desired points around the course. As can be seen by referring to Fig. 22, the arm 120 of the bell crank 102 is shorter than the arm 121 of the bell crank 103. One of the mechanisms illustrated in Fig. 7 is disposed so as to operate on the arm 121 and the other is disposed so as to operate on the arm 120. When the lever 89 which is adapted to operate on the arm 121 is disposed in its vertical position and when the arm 121 strikes said lever 89, the bell crank 103 will be caused to pivot and this will cause movement of the arm 107 thereof in the direction of the bracket 110. This will cause the rocker 104 to act against the spring 11 and this movement will be translated through the link 108 to raise the arm 96 above the horizontal. This movement is utilized in order to direct the lure over a hurdle or other obstacle placed in the course and thus cause the dogs to leap over this obstacle. It is apparent that any number of the devices diagrammatically illustrated in Fig. 7 might be propelled around the course in order that any desired number of hurdles might be negotiated but if it is desired to end the race by concealing the lure as has been described, the other of the pair of devices illustrated in Fig. 7 is caused to operate in conjunction with the one which operates on the arm 121. This will cause the arm 120 to strike the lever 89 and will cause the bell crank 102 to pivot which will move the arm 119 of this bell crank in such a way as to cause the rod 116 to release the latch 114 from the carriage 98 and inasmuch as the rod 96 will be disposed above the horizontal and the carriage 98 will travel down the arm 96 and this action will be materially aided by the releasing of the compressed spring 112. The lure receiving cage 73 will be suspended from the block 95 as is shown in Fig. 22, and it is apparent that this cage will be in position to receive and conceal the lure 100.

In Figs. 24 and 25 a structure is depicted through the use of which I am enabled to dispense with the devices illustrated in Fig. 7. In this structure trolleys 126 are adapted to supply current to the motor 45. In place of the bell cranks 102 and 103 electro-magnets such as 127 are provided. In Fig. 26 the magnet 127 is adapted to attract the armature 128 which is secured to the arm 104. When the armature 128 is attracted the arm 104 is moved and raises the arm 96, in the manner, and for the purpose, described. The other of the magnets operates on the rod 116 in a manner similar to the bell crank 102. Conductors 129 are provided for individually supplying current to the magnets 127, one of the conductors 126 comprising the other side of the line. The circuit to the magnets 127 will be controlled by push buttons such as 91, said buttons being located similar to the button 91.

In order to install the apparatus, suitable stakes such as 125 are located around the course and the track supporting brackets 14 are secured thereto. The track 15, which has been described, comprises a plurality of sections which will be fitted together and the lure propulsion device will be mounted thereon. The devices such as those illustrated in Fig. 7, will be mounted in desirable points around the tracks and the various control devices such as the rheostat 56 and the switches 91 will be located at a desired point and the proper connections will be made and the device will be ready for operation. It is apparent that this construction embodies numerous advantages over the so-called permanent installations inasmuch as it may be quickly set up or quickly dismantled.

In Fig. 27 a modified structure is illustrated, wherein a pipe-like member 130 is substituted for the track 15. The lure propelling mechanism 131 is suspended from an axle structure 132 in any approved manner. Wheels 133 are mounted on the axle structure 132 and are adapted to ride on the inner surface of the pipe-like member 130, which has a slot 134 therein through which the support 135 protrudes, to which the lure propelling mechanism is attached. On the upper inner side of the member 130 an insulating strip 136 is mounted and trolleys 137 and 138 are carried thereby.

A bracket 139 is carried by axle structure 132 which is substantially T-shaped and rollers 140 and 141 are mounted on the braces thereof in such a way as to be insulated therefrom. These rollers 140 and 141 engage trolleys 137 and 138 and are connected to the usual electric motor 45 carried on the lure propelling mechanism 131.

In Fig. 28 a similar structure is provided, the difference residing in the formation of the track member. In this instance the member 130 is made substantially rectangular.

It is to be understood that the wheel structure on the lure propulsion device might be altered, and if desired, two wheels might be used which would be adapted to travel on the upper side of the track 15 and the carriage might be suspended from the structure carrying said wheels in a balanced manner.

It is to be understood that various mechanisms heretofore described might be encased in suitable casings in order to properly cover them so as to protect them from injury and weather and also to prevent the racing animals from coming in contact therewith.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A racing device including an elevated monorail track co-extensive with a course, a carriage, said carriage including a supporting portion having bearings at the ends thereof, structures providing wheels and having the wheels thereof disposed on said track, means for pivotally connecting certain of said structures in said bearings, and means carried in the supporting portion of said carriage for operating on certain of said wheels to propel said carriage along said track.

2. A racing device including an elevated monorail track co-extensive with a course, a carriage including a supporting portion having bearings at the ends thereof, axle bearing structures, means for pivotally connecting certain of said axle bearing structures in said bearings, wheels mounted on the axles of said axle bearing structures and disposed on said track to suspend the supporting portion of said carriage below said track, electric motive means mounted in the supporting portion of said carriage, and means for connecting said electric motive means to certain of said wheels whereby the movement of said motive means will be transmitted to said wheels to propel said carriage along said track.

3. A racing device including an elevated monorail track co-extensive with a course, a carriage including a supporting portion having bearings at the ends thereof, axle bearing structures, means for pivotally connecting certain of said axle bearing structures in said bearings, wheel mounted on the axles of said axle bearing structures and disposed on said track to suspend the supporting portion of said carriage below said track, electric motive means mounted in the supporting portion of said carriage, means for connecting said electric motive means to certain of said wheels whereby the movement of said motive means will be transmitted to said wheels to propel said carriage along said track, trolley means, means for supporting said trolley means from said track, and means carried by said carriage and disposed to bear against said trolley to establish an electric circuit between said electric motive means, said trolley, and said track.

4. A racing device including an elevated monorail track co-extensive with a course, a carriage including a supporting portion having bearings at the ends thereof, axle bearing structures, means for pivotally connecting certain of said axle bearing structures in said bearings, wheels mounted on the axles of said axle bearing structures and disposed on said track to suspend the supporting portion of said carriage below said track, an electric motor mounted on the supporting portion of said carriage, an electrical current supplying conductor on said track and a trolley carried by said carriage contacting with said conductor for supplying current to said motor whereby rotation of said motor will be transmitted to said axle and the wheels carried thereby to propel said carriage along said track.

5. A racing device including an elevated monorail track co-extensive with a course, a carriage including a supporting portion having bearings at the ends thereof, axle bearing structures, means for pivotally connecting certain of said axle bearing structures in said bearings, wheels mounted on the axles of said axle bearing structures and disposed on said track to suspend the supporting portion of said carriage below said track, an electric motor mounted on the supporting portion of said carriage, an electrical current supplying conductor on said track and a trolley carried by said carriage contacting with said conductor for supplying current to said motor whereby rotation of said motor will be transmitted to said axle and the wheels carried thereby to propel said carriage along said track, and means carried by said structures bearing against the sides of said track to prevent transverse movement of said carriage as said carriage is moved along said track.

In testimony whereof I affix my signature.

ELMER L. BALLEW.